V. H. FELT.
Harvester-Rake.

No. 159,808

Patented Feb. 16, 1875.

Witnesses
D. P. Cowl
Edmund Masson

Inventor.
Vanderlyn H. Felt.
By atty A. B. Stoughton.

UNITED STATES PATENT OFFICE.

VANDERLYN HOWARD FELT, OF KENDALL, ASSIGNOR OF ONE-HALF HIS RIGHT TO D. M. OSBORNE & CO., OF AUBURN, NEW YORK.

IMPROVEMENT IN HARVESTER-RAKES.

Specification forming part of Letters Patent No. 159,808, dated February 16, 1875; application filed June 12, 1874.

*To all whom it may concern:*

Be it known that I, VANDERLYN H. FELT, of Kendall, in the county of Orleans and State of New York, have invented certain new and useful Improvements in a Combined Rake and Reel for Harvesting-Machines; and I do hereby declare the following to be a full, clear, and exact description of the same, reference being had to the accompanying drawings, making a part of this specification, in which—

Figure 1:
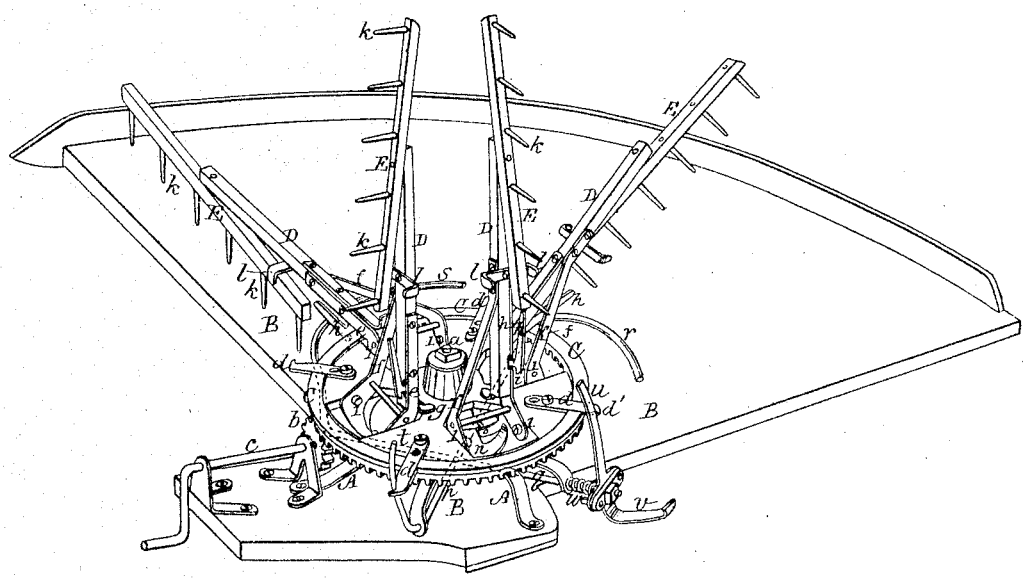
Figure 2:
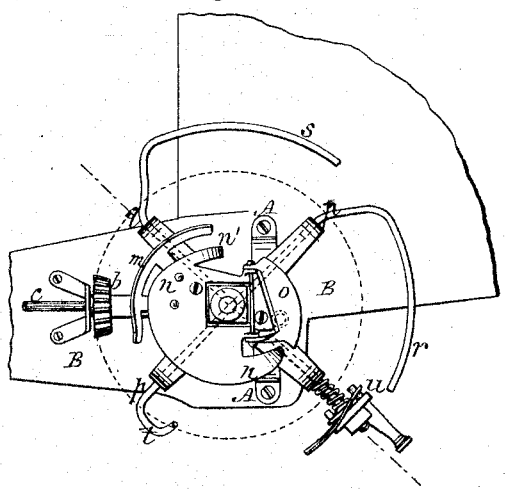
Figure 3:
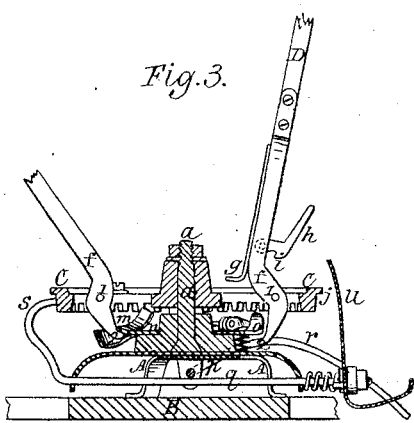

Figure 1 represents in perspective so much of a harvesting-machine as will illustrate my invention. Fig. 2 represents a plan of the mechanism underneath the rake-driving wheel, said wheel and the rakes being removed so as to show the parts otherwise concealed by them. Fig. 3 represents a vertical section through the hub and spindle of the rake-driving wheel and its connected parts.

My invention consists in the combination of rocking crank arms or camways, in combination with the rake driving and carrying wheel, and adjustable projections thereon, by which any one of the rakes may be raised up and carried over the platform without sweeping or clearing it, or any one caused to act as a rake, as may be determined upon, or as the operator may desire.

My invention further consists in the combination of the rocking crank or cam arms with self-locking latches on the rake-shanks, so that when the rakes are to be raised up to pass above the platform, the latches will be unlocked by said rocking cam-arms, and when the rake is to clear the platform then that rake remains locked by its latch.

To enable others skilled in the art to make and use my invention I will proceed to describe the same with reference to the drawings.

On a spider-frame, A, supported on the main-frame end of the platform or platform-frame B, or partially on both, there is a vertical journal, $a$, upon which the rake carrying and driving wheel C is supported, said wheel being driven by a pinion, $b$, on a shaft, $c$, the pinion and shaft receiving their motion from the main carrying and driving wheel or wheels in the common well-known way. The rake-wheel C has a cogged rim on its under side, with which the pinion $b$ gears to drive said wheel. In openings made in the rake-wheel are pivoted, as at 1, the series of rake shanks or arms D, and upon the wheel are a series of adjustable arms, $d$, for a purpose to be hereafter described. The rake shanks or arms D may be of wood, and have connected to them metal straps $e\ f$, one of which, $e$, is parallel with the rake-shank, and the other, $f$, oblique or inclined, both extending far enough back of the rake-shank to form the hinge or pivot 1, upon which the rake-shank rises and falls. One of the straps $f$ extends beyond the pivotal point 1, and has a hook-shaped end, 2, which takes under or rides upon camways under the drive-wheel C, for a purpose to be hereafter explained. On the back or top of the rake-shank there is a bent-up piece of metal, $g$, which, when the rakes are moved up into a vertical, or nearly so, position, rests upon the top of the rake-wheel C, and sustains, or aids in sustaining, the rakes in that position. Connected to or with each of the rake shanks or arms D there is a lever-latch, $h$, the shoulders $i$ of which, when the rake drops down upon the wheel C, take under a projecting flange, $j$, on said wheel, and lock the rake thereto, so that, when any of the rakes may be arranged for clearing the platform of the cut grain, that rake cannot rise over or on the straw. But when any of the rakes are to be raised up to pass over the platform without raking, then the latch of that rake is first unlocked, and by the mechanism that raises up such rake. Toward the outer ends, respectively, of the rake-shanks or arms D there is pivoted a rake-head, E, in which the rake-teeth $k$ are set. The rake-head is so pivoted that it may have a movement thereon independent of the circuit of the rake shank or arm, but restricted within certain limits by the stops $l$ on the rake-arm D. The object of this independent movement of the rake-head is that in raking in the grain to the cutters it may assume a position more nearly parallel with the cutters than the rake-arm itself has, and more uniformly present the grain to the cutters. Upon the spider-frame A, underneath the rake-carrying wheel C, is arranged a camway, $m$, a fixed cam-plate, $n$, and a spring or yielding cam-plate, $o$, as seen in Fig. 2. As the rakes come around with the rake-wheel, and are about to drop into the grain to draw it to the cutters, the tail-piece 2 of the rake-connection $f$ bears against the camway $m$, and sustains the rake, but gradually moving it out of its perpendicular, and into an inclined position toward the grain into which it is to drop, and when the rake is far enough inclined to overbalance itself in that direction it drops a short distance, and until the tail-piece takes under the cam-plate $n$, by which it is held. When the tail-piece moves out from under the cam-plate at $n'$, where it becomes free, the rake drops down upon the rake-wheel C, and is locked thereto by the shoulder or catch $i$ on the pivoted latch-lever $h$ taking under the flange $j$ of the rake-wheel, and the rake remains so locked down until released by other mechanism, which will be now described. On the spider-frame, below the parts $m$ $n$ $o$, just above described, are arranged two cross-shafts, $p$ and $q$, at right angles to each other. The ends $r$ and $s$ of these cross-shafts next the platform or grain table are curved upward and rearward so that when said ends are raised up the rake may ride upon them in a raised-up position. The opposite end $t$ of the cross-shaft $p$ is bent upward and forward, (calling the direction in which the rake-wheel travels forward,) but the opposite end $u$ of the cross-shaft $q$ is differently arranged—namely, so that it will, in its normal condition, rock its shaft when one of the projections $d$ on the rake-wheel comes against it, but it may be drawn away by the operator on the machine, so that the projections $d$ will not reach it, in which event every rake will clear the platform, but if allowed to resume its normal position every projection that comes against it causes it to throw up its opposite end $s$, which first throws out the lever-latch $h$, and then raises up the rake and carries it clear above the platform.

In arranging the rakes for operation, one of the projections, as at $d'$, Fig. 1, is set back, so that it will not come against the arm $u$ of the rock-shaft $q$, and consequently said shaft remains inactive, and its opposite end $s$ not being raised up, the latch remains locked to the rake-wheel, and that rake will sweep the platform of the cut grain. So, too, would any of the other rakes, if the projection that operates with it fails to come against the arm or upright $u$, be a platform-clearing rake; and, on the contrary, if every projection $d$ were set out so as to come against the upright $u$, and cause it to rock its shaft $q$, and throw up the opposite end $s$ thereof, then every rake would rise up and ride over or above the platform without clearing it. Thus, any one of the rakes may be a beater, or a rake, and so continue to act in regular succession, as may be previously provided for, or the operator may allow any one to be a rake or a beater at his will by pressing with his foot upon the lever $v$, which is on the lower end of the upright $u$, and which moves said upright out of the path of the projections $d$, and hold it there or release it at pleasure, and when released the upright is returned to its normal working position by the reaction of the spring $w$. After the projections $d$ on the rake-wheel have passed the upright $u$ they next come against the bent end $t$ of the rock-shaft $p$, and by pressing down the end $t$ throw up the opposite end $r$ of said rock-shaft, and high enough to raise the rakes into a vertical position, and until the projection $g$ comes against the rake-wheel C. As the raising and lowering of the rakes is quite rapid, there is considerable momentum, and consequent jar, when stopped suddenly, as they must be, and for this reason the cam-plate $o$ has a spring-connection, as seen in Fig. 3, so that when the tails 2 of the rakes strike up, or against said plate, as they do in their rotation, the spring relieves the sudden jar. After the tail-pieces have passed the spring cam-plate $o$ they come against and partially under the edge of the stationary cam-plate $n$, and are held, and hold their rakes, in a vertical, or nearly so, position, until they are let down at $n'$ into the grain to draw it up to the cutters.

The straps $f$, while affording a broader and stronger hinge-connection between the rake-arms and the crown or carrying-wheel C, so brace the rake-arms with which they are connected that lighter and more easily operated rake-arms can be used, and still have the necessary rigidity to withstand the work they are designed for.

The object of raising and carrying the rakes in a vertical position throughout a portion of their circuit is that they may pass by the driver in his seat without incommoding him.

Having thus fully described my invention, what I claim is—

1. In combination with the rake-carrying and driving wheel C, and its projections $d$, the rocking cross-shafts $p$ $q$, and their respective arms, for the purpose of setting or converting the rake from a beater to a rake, or vice versa, as and for the purpose described and represented.

2. In combination with the wheel C, and the rakes pivoted thereto, the lever-latches, and the rocking cross-shafts and their arms, for the purpose of holding the rake from rising when it is to sweep the platform, and to unlock it when it is to rise to pass above the platform, substantially as described.

3. The combination of the tail-pieces 2 of the rake-arms with the spring and holding plates $o$ $n$ for easing the rakes when raised, and holding them up as they pass the driver's seat, as described.

VANDERLYN HOWARD FELT.

Witnesses:
L. B. FELT,
H. T. WHITTIER.